United States Patent [19]
Nodama

[11] Patent Number: 5,243,434
[45] Date of Patent: Sep. 7, 1993

[54] SWIVEL DEVICE FOR A TELEVISION RECEIVER

[75] Inventor: Takashi Nodama, Nagaokakyo, Japan

[73] Assignee: Mitsubishi Denki Kabushiki Kaisha, Tokyo, Japan

[21] Appl. No.: 970,584

[22] Filed: Oct. 27, 1992

Related U.S. Application Data

[63] Continuation of Ser. No. 721,267, Jun. 26, 1991, abandoned.

[30] Foreign Application Priority Data

Jun. 29, 1990 [JP] Japan ............................. 2-173694

[51] Int. Cl.$^5$ ............................................. F16M 11/08
[52] U.S. Cl. ......................................... 358/249; 358/254; 248/919; 248/922; 248/550
[58] Field of Search ............... 358/249, 254; 248/186, 248/542, 652, 664, 349, 131, 425, 289.1, 658, 917–922; 212/247; 108/139, 142, 144; 211/1.5

[56] References Cited

U.S. PATENT DOCUMENTS

| | | | |
|---|---|---|---|
| 4,547,027 | 10/1985 | Scheibenreif | 248/921 |
| 4,561,619 | 12/1985 | Robillard et al. | 248/349 |
| 4,796,842 | 1/1989 | Hamada et al. | 248/186 |
| 4,905,543 | 3/1990 | Choi | 249/922 |
| 5,024,415 | 6/1991 | Purens | 248/349 |
| 5,093,729 | 3/1992 | Nodama | 358/254 |

FOREIGN PATENT DOCUMENTS

| | | |
|---|---|---|
| 3505606 | 8/1985 | Fed. Rep. of Germany . |
| 3706983 | 9/1987 | Fed. Rep. of Germany . |
| 3629052 | 11/1936 | Japan . |
| 57178765 | 5/1956 | Japan . |
| 60-11565 | 1/1985 | Japan . |

*Primary Examiner*—Edward L. Coles, Sr.
*Assistant Examiner*—Jill Jackson

[57] ABSTRACT

In a television receiver swivel device, a turning ring rides on an annular groove on the upper surface of a supporting base so that it is capable of swiveling relative to the supporting base. A television receiver cabinet rides on this turning ring so that it is capable of swiveling relative to the turning ring. A stopper is interposed between the lower surface of the bottom panel of the cabinet and the upper surface of the supporting base such that swivel motion is possible within a certain swivel range and is prevented from swiveling beyond the swivel range. A manually operated override is provided to override the restriction, so that the television receiver can be swiveled manually beyond said predetermined swivel range to an angle of 180°. A power supply limit switch may further be provided such that electric power to the television receiver is interrupted when the television receiver swivels beyond a second predetermined range (which may or may not be identical to the first-mentioned predetermined range), and is restored when it returns within the second predetermined range.

9 Claims, 4 Drawing Sheets

SWIVEL DEVICE FOR A TELEVISION RECEIVER

This application is a continuation of application Ser. No. 07/721,267 filed on Jun. 26, 1991, now abandoned.

FIELD OF THE INVENTION

The present invention relates to a television receiver swivel device which permits the cabinet by remote control or manual action.

BACKGROUND OF THE INVENTION

An example of remote controlled swivel device for a television receiver is disclosed, for example, in Japanese Utility Model Kokai Publication No. 57-178765. In the device therein disclosed, a pair of stoppers are provided on a fixed portion of the device, to limit, to a predetermined range, swivel motion of the mounting plate on which the television receiver rests.

Another example of conventional remote swivel device for a television receiver is disclosed in Japanese Utility Model Kokoku Publication No. 36-29052, in which no stoppers are provided. When no stoppers are provided, swiveling the television receiver through a large range will cause pulling on and breaking of the antenna wire and power cord and irregular color of the image. Thus, for practical purposes, providing stoppers is essential.

In the first-mentioned example of the conventional swivel device above described, the swivel means for the television receiver comprises a fixed portion containing therein a driving device comprising an electric motor and reduction gears, and a swiveling mounting plate which is supported on this fixed portion and has an upper surface on which the cabinet of the television receiver is mounted.

When a signal emitted from the remote control signal generator is received by the television receiver, the driving device is actuated causing the mounting plate and the television receiver to swivel. The top plate is provided with a limit switch that is actuated when swivel motion reaches a predetermined angle, stopping the driving action of the driving device. In addition, if the television receiver is turned by hand, a restraining rib on the mounting plate strikes against a stopper so that swiveling beyond the predetermined angle is prevented mechanically.

Limiting the swiveling to a certain angular range is inconvenient since the antenna terminal board and video tape recorder input and output terminals of television receivers are generally located at the rear. If the swiveling is limited to a certain range, the work of connecting the leads of an antenna or video tape recorder, or of changing these connections, makes it necessary to go around behind the television receiver.

Another problem associated with the conventional television receiver swivel devices described above is that when the television receiver is swiveled 90° from the reference position with the television front part facing the front), since the television receiver is susceptible to the effects of geomagnetism (earth magnetism) the electron beam being radiated onto the picture tube (CRT) to make the image is deflected from its target by geomagnetism, resulting in irregular color.

SUMMARY OF THE INVENTION

The present invention has been devised with a view to solving these problems.

An object of the invention is to provide a television receiver swivel device in which swiveling of the television receiver by an electric motor, e.g., responsive to a signal from a remote control signal generator, is permitted within a predetermined range, and a greater degree of swiveling is obtained by manual action so that the rear of the television receiver may be turned toward the front and connection work can be carried out conveniently.

In the television receiver swivel device of the present invention, a turning ring rides on an annular groove on the upper surface of a supporting base so that it is capable of swiveling relative to the supporting base, a television receiver cabinet rides on this turning ring so that it is capable of swiveling relative to the turning ring, a stopper means is interposed between the lower surface of the bottom panel of the cabinet and the upper surface of the supporting base such that swivel motion is normally (with the overriding means not in operation) possible within a predetermined swivel range and swiveling beyond this predetermined range is prevented.

A manually operated overriding means is provided to override the restriction, so that the television receiver can be swiveled manually beyond said predetermined swivel range to an angle of 180°.

Additionally, there may be provided a power supply limit switch such that electric power to the television receiver is interrupted when it swivels beyond a second predetermined range (which may or may not be identical to the first-mentioned predetermined range), and is restored when it returns within the second predetermined range.

In a typical situation, the driving device is actuated by the signal from the remote control signal generator, causing the television receiver to swivel within the first predetermined range. The television receiver is restricted by the stopper means from swiveling beyond the predetermined range. To swivel the television receiver beyond the predetermined range, the overriding means is manually operated, overriding the function of the stopper means. The orientation of the television receiver may then be changed by manually turning it until the rear face the front, allowing connection work to be carried out conveniently.

Where the power supply limit switch is provided to interrupt the power supply of the television receiver when the television receiver moves beyond the second predetermined swivel range, the image is extinguished so that images infected with irregular color due to the effect of geomagnetism is not seen. When the television receiver returns within the second predetermined swivel range, the power supply limit switch restores electric power to the television receiver, eliminating the influence of geomagnetism, and an image free of irregular color appears automatically. As is usual, a degaussing circuit is activated when television receiver power is turned on to eliminate the adverse effects of geomagnetism. Accordingly, by turning off the supply of the electric power when the second predetermined swivel range is exceeded, and turning on when the television receiver is returned to within the second predetermined swivel range, the degaussing circuit is activated and the effect of the geomagnetism which is received while the television receiver is swiveled away from the front-facing position, and is otherwise left even after the television receiver is returned to the front-facing position is removed.

DETAILED DESCRIPTION OF THE PREFERRED EMBODIMENTS

Figure 1:
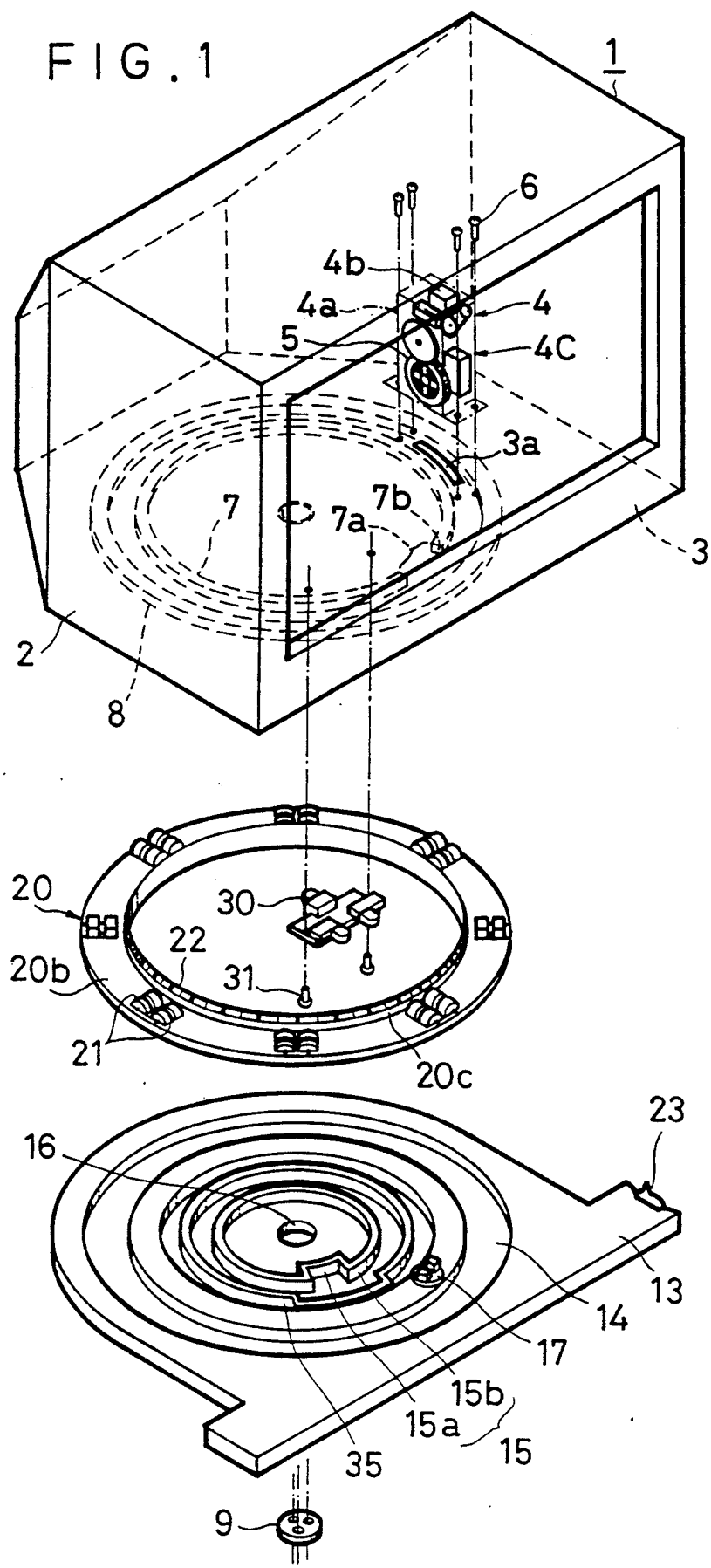
FIG. 1 is an exploded view of a swivel device for a television receiver in accordance with an embodiment of the present invention.
Figure 2:
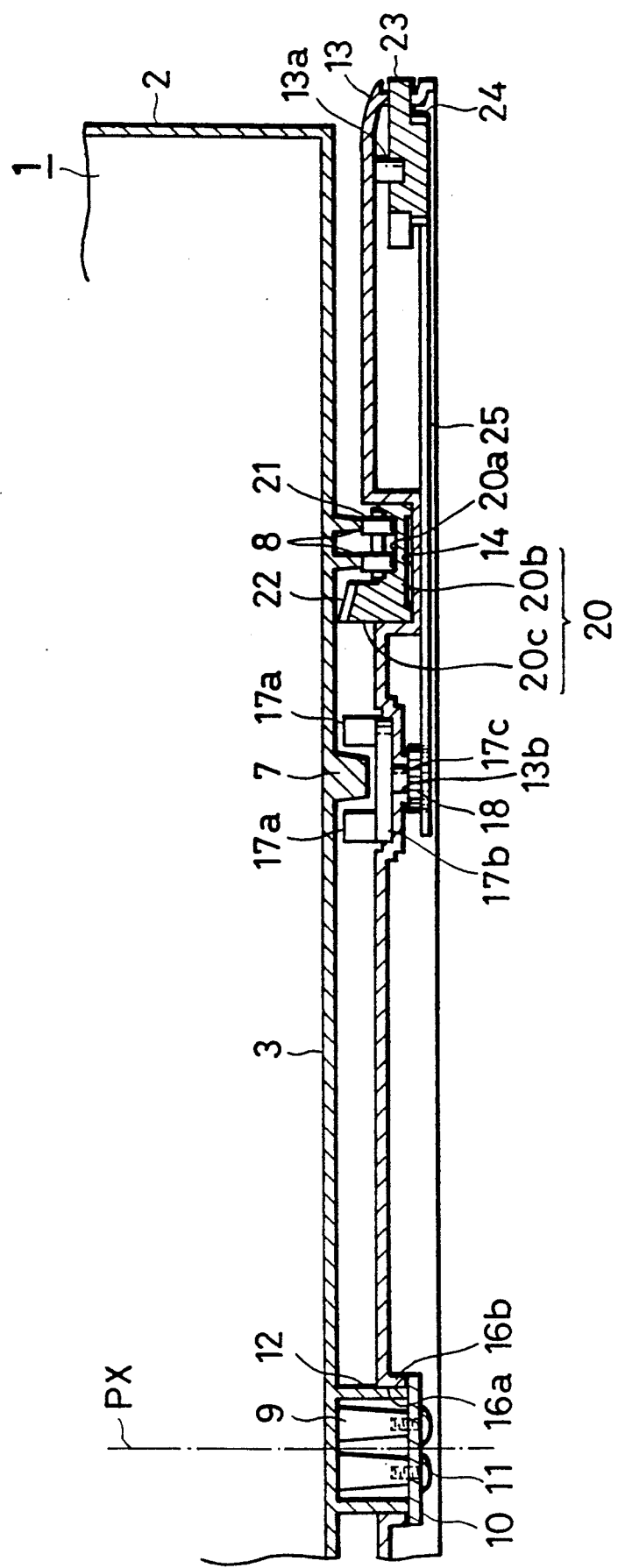
FIG. 2 is a vertical cross section of the device of FIG. 1 in the assembled condition.

An embodiment of the invention will now be described with reference to the drawings. Referring first to FIG. 1 and FIG. 2, a television set includes a cabinet 2 for housing a television receiver 1. The cabinet 2 includes a bottom panel 3. The cabinet 2 is supported on a turning ring 20 in such a manner that it can swivel relative to the turning ring 20 (when gears 5 and 22, to be described later, meshing with each other rotate). The turning ring 20 is supported on a supporting base 13, in such a manner that it can swivel relative to the supporting base 13. The supporting base 13 is to be placed on a television stand or on the floor (not shown).

Three mounting seats 9 (FIG. 2) are fixed to the lower surface of the bottom panel 3 at the pivot axis PX for the swiveling. More specifically they are at the vertexes of a small triangle centered on the pivot axis PX. They are integral with the bottom panel 3, and encircled by a protruding guide cylinder 12 fixed to and extending from the lower surface of the bottom panel 3, and centered on the pivot axis PX. A holding plate 10 is mounted to the mounting seats 9 by means of mounting screws 11. Provided at the center of the supporting base 13 is a guide hole 16a. Extending downward from the periphery of the guide hole 16a is a guide cylinder 16b. The protruding cylinder 12 of the bottom panel 3 is fitted in the guide cylinder 16b and its outer surface is slidably engaged with the inner surface of the cylinder 16b, so that the cabinet 2 is capable of swiveling relative to the supporting base 13 and at the same time the axis of swiveling is established by the slidable engagement between the cylinders 12 and 16b.

A driving device 4, whose frame 4a is mounted to the bottom panel 3 by means of mounting screws 6, comprises an electric motor 4b and a reduction gear chain 4c including an output gear 5, which is a bevel gear having its axis extending horizontally, and has its lower part protruding downward through an opening 3a in the bottom panel 3 of the cabinet 2.

The turning ring 20 comprises a flange-shaped part 20b and a cylindrical part 20c extending upward from the inner periphery of the flange-shaped part 20b and provided with a bevel gear 22 formed to extend along the top end of the cylindrical part 20c. The bevel gear 22 has its axis coincident with the pivot axis PX, and meshes with the bevel gear 5 of the driving device 4.

The supporting base 13 is provided with an annular receiving groove 14 coaxial with the cylinder 16b, and hence centered on the pivot axis PX. The flange-shaped part 20b of the turning ring 20 is received in the receiving groove 14, and is slidable against the groove 14, so that the turning ring 20 is capable of swiveling with the flange-shaped part 20b sliding against the groove 14.

A plurality of supporting concavities 20a are provided on the upper surface of the flange-shaped part 20b of the turning ring 20. They are at locations along the circumference of the turning ring 20. Each of the concavities 20a are for receiving and supporting two pairs of casters 21, with their axis of rotation orthogonal to the pivot axis PX.

The cabinet 2 is provided with a pair of coaxial annular projections 8 both coaxial with the cylinder 12, and extending downward from the lower surface of the bottom panel 3. The lower extremities of the projections 8 are slidably supported on the top surfaces of the casters 21.

The electric motor 4b of the driving device 4 rotates under control of a remote control signal generator, not shown. When the electric motor 4b rotates, the output gear 5 of the driving device 4 rotates. The output gear 5 is meshing with the large-diameter bevel gear 22 of the turning ring 20. The flange-shaped part 20b of the turning ring 20 is in sliding contact with the annular receiving groove 14 of the support base 13. The friction between the flange-shaped part 20b and the groove 14 is relatively large, so the turning ring 20 remains stationary relative to the supporting base 13, while the cabinet 2, with the driving device 4 including the output gear 5 swivels, due to the reaction from the swivel support ring 20.

When the cabinet 2 is turned by hand, while the electric motor 4b of the driving device 4 is not rotating, the cabinet 2 and the turning ring 20 are kept fixed relative to each other because of the meshing between the gears 5 and 22, and the flange-shaped part 20b slides against the annular groove 14, so the cabinet 2 and the turning ring 20 swivel together relative to the supporting base 13.

If the cabinet 2 is held by hand to prevent rotation while the electric motor 4b of the driving device 4 is rotating, the turning ring 20 rotates sliding against the groove 14, while the cabinet 2 is fixed relative to the supporting base 13.

A restraining rib 7 consists of an annular protrusion coaxial with the cylinder 12 and extending downward from the lower surface of the bottom panel 3, with a predetermined angular or swivel range cut away to form a gap 7a.

A stopper 17 is mounted on the supporting base 13. The stopper 17 comprises a disk-shaped part 17b connected to a shaft 17c, which extends through a hole 13b in the supporting base 13 and about which the stopper 17 is capable of pivoting. Provided on and extending upward from the top surface of the disk-shaped part 17b are a pair of engagement projections 17a diametrically opposed to each other with respect to the axis of pivoting. Fixed to the lower end of the shaft 17c of the stopper 17 is a stopper gear 18.

When the stopper 17 is at such a rotary position that the pair of engagement projections 17a are oriented in the circumferential direction of the restraining rib 7, they can abut against the ends 7b of the restraining rib 7, and they thus restrain the swiveling of the cabinet 2 within a predetermined angular range a.

When the stopper 17 is at such a rotary position that the projections 17a are aligned in the radial direction (direction orthogonal to the pivot axis PX), the restraining rib 7 can pass through the space between the two engagement projections 17a, and the restriction on the swiveling of the cabinet 2 is removed.

Figure 3:
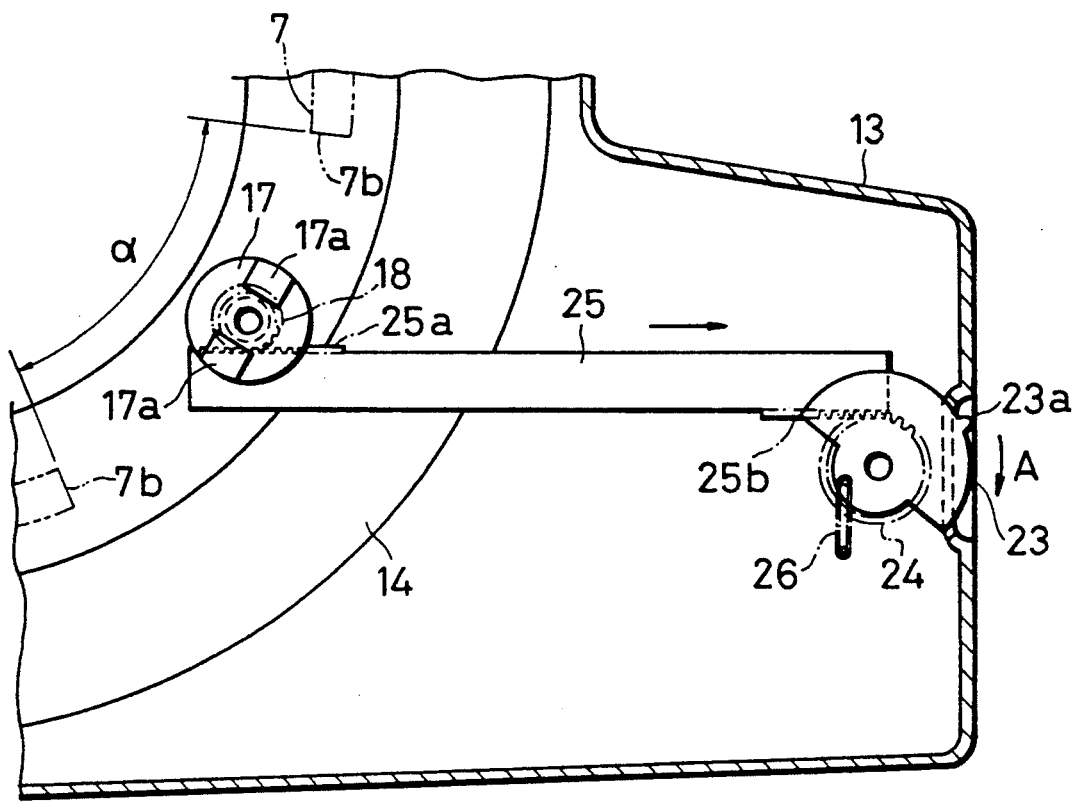
FIG. 3 is a plan view of the device in the condition in which the swiveling of the television receiver is restricted by a stopper means.
Figure 4:
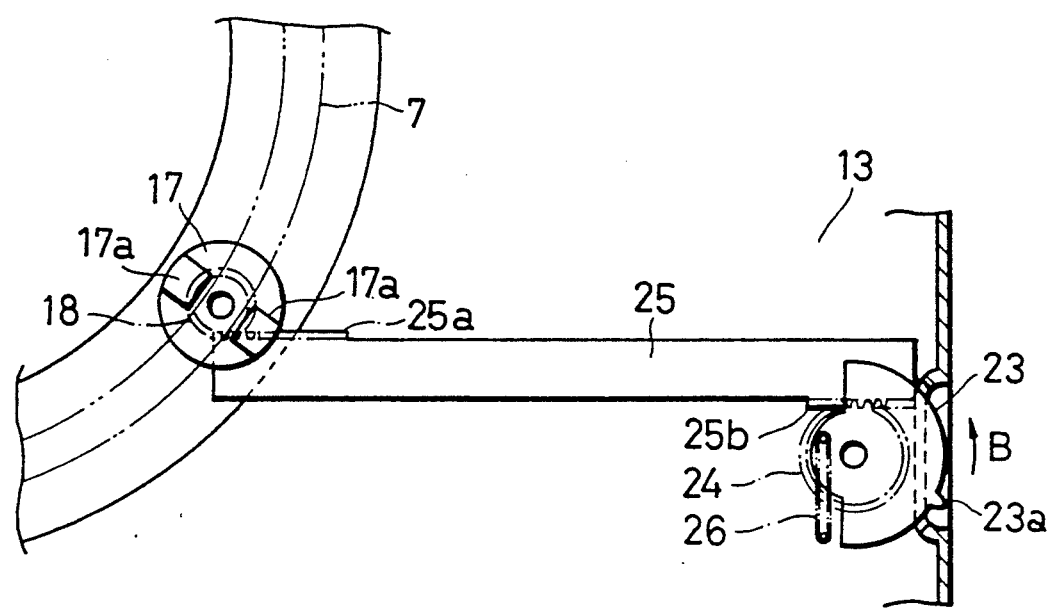
FIG. 4 is a plan view of the device in the condition in which the restriction by the stopper means is overridden by the overriding means of FIG. 3.

Referring next to FIG. 3 and FIG. 4, a lever 23 is supported by a support pin 13a fixed to and extending downward from the lower surface of the supporting base 13. Provided on the outer surface of the lever 23 is a tab 23a. Formed on the lower surface of the lever 23 is a lever gear portion 24.

A rack structure 25 is supported by the supporting base 13 so that it can move along its length. A rack portion 25a at one end of the rack structure 24 meshes with the stopper gear 18, and a rack portion 25b at the other end of the rack structure 25 meshes with the lever gear 24. A resetting spring 26 biases the lever 23 in the direction opposite to the direction of arrow A.

In the state illustrated in FIG. 3, the tab 25a is in the rest position in which the lever 23 is fully rotated in the direction opposite to the direction of arrow A. Being coupled via the lever gear 24, the rack structure 25, and the stopper gear 18, the stopper 17 is at such a rotary position in which the engagement projections 17a are aligned in the circumferential direction as shown in FIG. 3, and are engageable with the ends 7b of the restraining rib 7 when the cabinet 2 swivels. The swiveling of the cabinet 2 is thereby limited within the swivel range $\alpha$, as described before.

When the lever 23 is rotated by pushing the tab 23a in the direction A, the stopper 17 is rotated via the rack structure 25 and the stopper gear 18, as shown in FIG. 4, so the pair of the engagement projections 17a are aligned in the radial direction. In this state, the restraining rib 7 can pass between the two engagement projections 17a, so the cabinet 2 can be turned freely.

The tab 23a is pushed manually, typically by a finger, to rotate the lever 23. The cabinet 23 can then be turned or swiveled by hand. To rotate the lever 23, it is necessary to overcome the force of the resetting spring 26. When the tab 23a is released, the lever 23 is returned to the original rest position shown in FIG. 3 by the force of the reset spring 26.

The rotation within the angular range $\alpha$ can be made by rotation of the electric motor 4b, as described above.

When it is desired to swivel the cabinet 2 beyond the swivel range $\alpha$, the lever 23 is rotated in the direction of arrow A, overcoming the biasing force of the resetting spring 26, thereby pivoting the stopper 17 into the position in which the engagement projections 17a are aligned radially. Then, the cabinet 2 is swiveled by hand, with the annular restraining rib 7 passing between the engagement projections 17a. Once the restraining rib 7 is inserted between the engagement projections, the lever 23 may be released, since the restraining rib 7 is kept passing between the engagement projections 17a thereby maintaining the state in which the cabinet 2 can be swiveled freely by hand.

When the cabinet 2 is then swiveled by hand back into the swivel range $\alpha$, restraining rib 7 is disengaged from the projections 17a, and if the lever 23 is already released or is thereafter released, the lever 23 is caused by the resetting spring 26 to rotate back in the direction B, into the state shown in FIG. 3. This rotation is transmitted via the rack structure 25 to the stopper 17, which is thereby rotated back to the position in which the pair of engagement projections 17a are aligned in the circumferential direction, achieving a condition in which cabinet 2 is limited to the predetermined swivel range.

The lever 23 and the rack structure 25 thus form an overriding means for overriding the restriction by the stopper 17.

Figure 5:
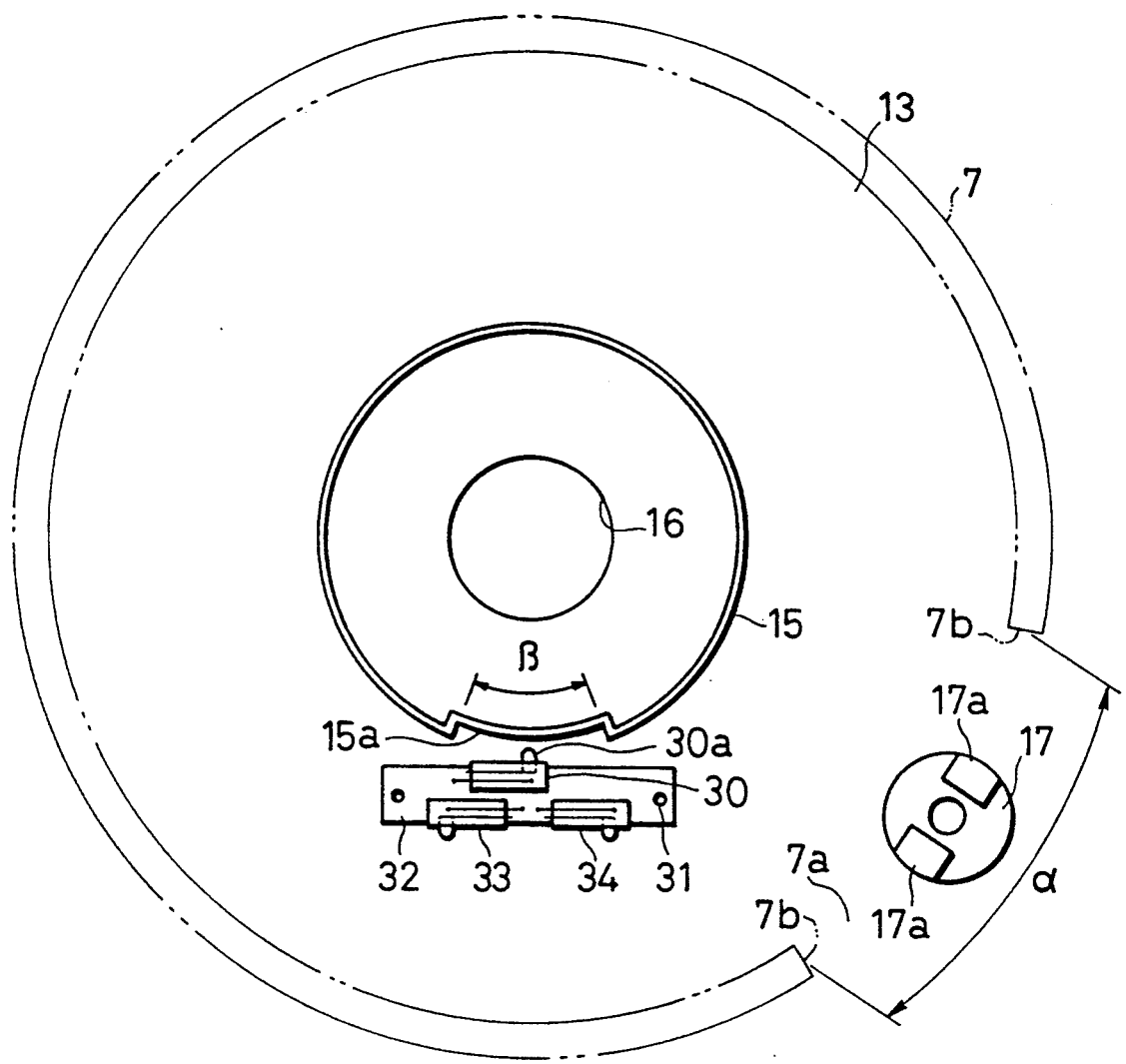
FIG. 5 is a plan view showing the relationship between the power supply limit switch of FIG. 1 and the abutment wall for switching on and off the power supply.

Referring to FIG. 5 as well as FIG. 1, an abutment wall 15 is formed on the upper surface of the supporting base 13. The abutment wall 15 comprises a larger-radius arcuate part 15b and a smaller-radius arcuate part 15a which are both centered on the pivot axis PX. The smaller-radius arcuate part 15a extends over an angle $\beta$. The larger-radius arcuate part over the remaining angle $360°-\beta$.

A power supply limit switch 30 having a contractor 30a is mounted to a mounting block 32 which is fastened by means of screws 31 to the lower surface of the bottom panel 3. The limit switch 30 is so positioned that the contactor 30a confronts and is not engaged with the smaller-radius arcuate part 15a while the cabinet is within the normal range of angle $\beta$ in which the cabinet is facing the front. In this state, the limit switch 30 permits supply of the electric power to the television receiver. When the cabinet 2 is swiveled beyond the angle $\beta$, the contactor 30a confronts and is engaged with the larger-radius arcuate part 15b, and the limit switch 30 then interrupts the supply of electric power to the television receiver.

When the cabinet 2 is swiveled back into the angular range $\beta$, the contactor 30a is disengaged from the larger-radius arcuate part 15b, so that the limit switch 30 resumes permitting supply of the electric power to the television receiver.

Because the power supply to the television receiver is interrupted when the cabinet is swiveled beyond the second swivel range $\beta$ image infected with the irregular color is not seen.

A degaussing circuit is activated when television receiver power is turned on to remove the adverse effects of geomagnetism. Accordingly, by turning off the supply of the electric power when the second angular range $\beta$ is exceeded, and turning on when the television receiver is returned to within the angular range $\beta$, the degaussing circuit is activated and the effect of the geomagnetism which is received while the television receiver is swiveled and is otherwise left even after the television receiver is returned to the front-facing position is removed.

The angular range $\beta$ may or may not be equal to the angular range $\alpha$ in which the swiveling is possible with the lever 23 in the rest position. In the illustrated embodiment, the angular range $\alpha$ is 30° (15° on either side from the reference position in which the front face of the television receiver is facing the exact front), and the angular range $\beta$ is slightly larger in both ways than the angular range $\alpha$. This means the range $\beta$ is exceeded (power supply to the television receiver is interrupted) when or a little after the swivel range $\alpha$ is exceeded.

Additional limit switches 33 and 34 also mounted to the block 32 cooperate with an additional abutment wall 35 to turn off the driving device 4 a little before the ends 7b of the restraining rib 7 come into contact with the engagement projections 17a and 17b.

The operation for swiveling the cabinet 180°, performing work connection on the back of the cabinet and swiveling the cabinet back into the front-facing position will now be described in sequence.

When the television receiver is facing the front, the gap 7a in the restraining rib 7 is positioned at the stopper 17, and the engagement projections 17a are oriented circumferentially, as shown in FIG. 3. In this condition, the driving device 4 can be actuated by means of the remote control signal generator so as to swivel the television receiver 1 within the swivel range α.

To swivel the television receiver to a greater angle to allow for connection work at the rear panel, the procedure is as follows. The manual lever 23 is rotated in direction A (FIG. 3), then the stopper 17 is rotated so that the pair of engagement projections 17a are oriented in the radial direction, as shown in FIG. 4. When, in this condition, the cabinet 2 is swiveled by hand, the restraining rib 7 passes between the pair of engagement projections 17a and the stopper 17 continues in the condition in which this restriction is overridden. Also, the power supply limit switch 30 comes into contact with the abutment wall 15, interrupting the supply of electric power to the television receiver 1, eliminating the effect of color irregularities due to geomagnetism, and thereby eliminating discomfort. The cabinet 2 is then swiveled (e.g., 180°) to a position in which its rear panel is toward the front, and the work of connecting external leads or changing connections of the television receiver is accomplished.

When the work is finished, the cabinet 2 is swiveled back to the original position by hand, causing the restraining rib 7 to be removed from between the pair of engagement projections 17a of the stopper 17 and, the stopper 17, actuated by the resetting spring 26, rotates so that the pair of engagement projections 17a are in the condition in which they are oriented circumferentially, restricting the swiveling of the cabinet 2, and allowing the television receiver 1 to be swiveled by the remote control within the predetermined range. Also, the power supply limit switch 30 is reset to the power-on condition, allowing electric power to be supplied to the television receiver 1.

In the embodiment described above, the power supply limit switch 30 automatically interrupts the supply of electric power to the television receiver 1 when the swivel motion exceeds the predetermined range, but it is possible to eliminate the power supply limit switch and provide a switch that is operated manually for degaussing when color irregularities occur. With this arrangement, the television receiver 1 can be swiveled 180° while the power supply remains on. In this case, however, the switch must be operated manually.

As can be seen from the foregoing, the present invention makes it possible, by disposing, on an annular groove in a supporting base, a turning ring capable of swivel motion, and by disposing on the turning ring a cabinet capable of swiveling, and by providing a stopper means between the bottom panel of the cabinet and the upper surface of the supporting base to permit swivel motion within a predetermined range, and restricting the swivel motion beyond this range, and by enabling the television receiver to be swiveled on the turning ring within the predetermined range by means of a driving device that is mounted on the cabinet and actuated by a remote control signal generator, and by making it possible to override the restriction of the swiveling by means of a restriction override means that is manually operated, allowing the television receiver to be changed 180° in orientation, and thereby allowing the convenient performance of connection work with the rear panel of the television receiver facing the front.

It is also possible, by providing a power supply limit switch between the bottom panel of the cabinet and the top surface of the supporting base, to turn the power supply to the television receiver off when the television receiver swivels beyond a predetermined range and back on when it returns to the predetermined range, thereby removing, by means of a degaussing circuit activated at the time of power on, the effects of geomagnetism, and preventing the occurrence of color irregularities.

What is claimed is:

1. A television receiver swivel device comprising:
   a television receiver having a cabinet including a bottom panel;
   an annular restraining rib formed on the lower surface of the bottom panel of the cabinet and open through a predetermined angular range to form a gap;
   a supporting base having an annular receiving groove on the upper surface thereof;
   a turning ring which is seated in the annular receiving groove of said supporting base so as to be capable of swiveling relative to the supporting base;
   said cabinet being slidably supported on the turning ring so as to be capable of swiveling relative to said turning ring;
   a driving device mounted to said cabinet and actuated so as to swivel said cabinet relative to said turning ring;
   a stopper means mounted to said supporting base and normally positioned in the gap of said restraining rib and engageable with the ends of said restraining rib thereby to restrict the swivel motion of the cabinet within the angular range of said gap; and
   a restriction overriding means mounted to said supporting base, and actuated manually to override the restriction by the stopper means, allowing the cabinet to be turned manually beyond the angular range.

2. The device of claim 1, wherein said turning ring is provided with a plurality of receiving concavities arranged along the circumference of the turning ring, each of said concavities receiving casters, each rotatable about an axis orthogonal to the axis of swiveling of the turning ring, and supporting said cabinet.

3. The device of claim 2, wherein said bottom panel of said cabinet is provided with an annular projection; and said casters support said annular projection.

4. The device of claim 1, wherein said driving device is mounted on said bottom panel of said cabinet and comprises an output gear having a lower part extending through an opening in the bottom panel and projecting downward from the lower surface of said bottom panel.

5. The device of claim 1, wherein said turning ring is provided with a gear meshing with the output gear of the driving device.

6. The device of claim 1, wherein said driving device is actuated responsive to a signal from a remote control signal generator.

7. The device of claim 1, wherein said stopper means comprises a pair of projections capable of assuming a first position in which the projections are aligned in the direction of the circumferential direction to abut the ends of the restraining rib, and a second position in which the projections are aligned in the radial direction to permits passage of the restraining rib between the projections, and said overriding means moves the stopper means between said first and second positions.

8. The device of claim 1, wherein the front part of said cabinet faces toward the front when said cabinet is within said angular range, and said cabinet needs to be swiveled beyond said angular range in order for the rear part of the cabinet to face toward the front.

9. The device of claim 1, further comprising a power limit switch interposed between the cabinet and the supporting base, permits supply of electric power to the television receiver when the cabinet is within a second angular range, and interrupts the supply of the electric power to the television receiver when the cabinet is outside the second angular range.

* * * * *